United States Patent
Loui et al.

(10) Patent No.: US 6,636,648 B2
(45) Date of Patent: *Oct. 21, 2003

(54) ALBUMING METHOD WITH AUTOMATIC PAGE LAYOUT

(75) Inventors: Alexander C. Loui, Penfield, NY (US);
John K. McBride, Rochester, NY (US);
Stephen L. Shaffer, Penfield, NY (US);
Mark D. Wood, Penfield, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,310

(22) Filed: Jul. 2, 1999

(65) Prior Publication Data

US 2003/0072486 A1 Apr. 17, 2003

(51) Int. Cl.[7] ............................. G06K 9/36; H04N 5/76; G06F 15/00
(52) U.S. Cl. ..................... 382/284; 348/231.2; 715/517
(58) Field of Search ............................. 382/175, 284, 382/294, 164, 168; 358/302, 448, 452, 453; 707/517; 348/231.2; 715/517

(56) References Cited

U.S. PATENT DOCUMENTS

| | | | |
|---|---|---|---|
| 4,888,648 A | | 12/1989 | Takeuchi et al. ............. 358/335 |
| 5,563,722 A | | 10/1996 | Norris ......................... 358/453 |
| 5,751,505 A | * | 5/1998 | Yoshida ........................ 360/48 |
| 5,757,560 A | * | 5/1998 | Fisherman .................. 359/821 |
| 5,760,917 A | * | 6/1998 | Sheridan ..................... 358/442 |
| 5,768,469 A | * | 6/1998 | Yagasaki et al. ............ 386/109 |
| 5,796,428 A | * | 8/1998 | Matsumoto et al. ........ 348/231 |
| 6,222,947 B1 | * | 4/2001 | Koba ......................... 382/284 |
| 6,324,545 B1 | * | 11/2001 | Morag ........................ 707/202 |
| 6,351,556 B1 | * | 2/2002 | Loui et al. .................. 382/164 |

FOREIGN PATENT DOCUMENTS

EP 0 618 501 A1 * 10/1994 .......... G03D/15/00

OTHER PUBLICATIONS

U.S. patent application Ser. No. 09/163,618, Loui et al., filed Sep. 30, 1998.
U.S. patent application Ser. No. 09/199,639, Shaffer et al., filed Nov. 25, 1998.
U.S. patent application Ser. No. 09/197,363, Loui et al., filed Nov. 20, 1998.
U.S. patent application Ser. No. 09/274,645, Savakis et al., filed Mar. 23, 1999.
"Creative Photo Albums", DogByte Development, http://www.jacksonville.com/tu-online/stories/041998/bus_TECH_soft.html.

* cited by examiner

Primary Examiner—Wenpeng Chen
(74) Attorney, Agent, or Firm—David M. Woods (57) ABSTRACT

An albuming method includes the automatic adaptation of the page layout of a plurality of images to a boundary condition of an event. The method includes the steps of receiving a plurality of images having event-determining information that relates to one or more events to which the images pertain and the generation of an event boundary based on the on the event-determining information. The images for each event are then laid out into a page format adapted to the event boundary determined for that event. For example, if the page format is determined to have a maximum number of images per page, and if the number of images remaining for the last page are fewer than the maximum number, the page layout of the last or more pages of the event is automatically adapted to the event boundary by, e.g., adjusting the arrangement of the pictures on the last page.

28 Claims, 6 Drawing Sheets

ALBUMING METHOD WITH AUTOMATIC PAGE LAYOUT

CROSS-REFERENCE TO RELATED APPLICATION(S)

Reference is made to commonly assigned application Ser. No. 09/163,618, entitled "A Method for Automatically Classifying Images into Events" and filed Sep. 30, 1998 in the names of Alexander Loui and Eric Pavie; Ser. No. 09/197,363, U.S. Pat. No. 6,351,556 issued Feb. 22, 2002, entitled "Method for Automatically Comparing Content of Images for Classification into Events" and filed Nov. 20, 1998 in the names of Alexander Loui and Eric Pavie; and Ser. No. 09/274,645, U.S. Pat. No. 6,535,636 issued Mar. 18, 2003, entitled "A Method for Automatically Detecting Digital Images that are Undesirable for Placing in Albums" and filed Mar. 23, 1999 in the names of Andreas Savages and Alexander Louie, each of which are assigned to the assignee of this application.

FIELD OF THE INVENTION

The invention relates generally to the field of digital photography, and in particular to the automatic organization of pictures generated by a digital photographic system into a picture album.

BACKGROUND OF THE INVENTION

The wide-spread use of image capturing and scanning devices such as digital cameras and low-cost scanners is rapidly resulting in the digital equivalent of the overstuffed shoebox full of snapshots. The availability of images in a digital form is further increased by growing commercial digitization of conventional silver halide photography. Furthermore, the Internet has enabled easy distribution and replication of digital imagery, making it convenient for people to readily share pictures with others. This glut of imagery begs for tools for efficient organization and albuming of these images and multimedia data.

One of the main reasons people take pictures or video is to capture the occurrence of events so that they can share these memories and stories with their family and friends. However, a person must often overcome many barriers before being able to effectively convey an intended story from pictures. For example, if someone wants to construct a photo album of her vacation, she would have to go through all the candidate pictures to sort them in terms of the events, the image quality, and to select the best from duplicates, etc. After this organization and sorting effort, she will have a collection of pictures that can be used to construct the album. Then she will have to work out the arrangement or layout of the pictures in the different album pages. This, of course, will involve artistic consideration; the chronology of the events may also be an important factor. Finally, she might wish to add annotations for some pictures in the album pages. We can see that a considerable amount of time and effort is needed in creating a good album. As more and more pictures are being digitized, either directly through digital cameras or through scanners, there is increasing need for automatic organizing and authoring of picture albums.

Many existing digital products offer ways of producing photo album pages from images that have been digitally captured or generated. Microsoft PictureIt, for example, has the capability for pasting pictures into pages and adding special effects to text. Most drawing and photo editing programs have similar capabilities. U.S. Pat. Nos. 4,888,648 and 5,563,722 describe methods and apparatus using a computer for arranging photographic images into albums. In each case, the computer is basically used as an editing tool with which a user systematically and intensively interacts in order to arrange images into the album pages. What is needed is an albuming system that removes some of the burden from the user, e.g., by making at least a first draft attempt to group the images into events according to certain logical criteria, and then to offer to the user a page layout tailored for each event.

SUMMARY OF THE INVENTION

The present invention is directed to overcoming one or more of the problems set forth above. Briefly summarized, according to one aspect of the present invention, a method for automatically adapting the page layout of a plurality of images to a boundary condition of an event comprises the steps of (a) receiving a plurality of images having event-determining information that relates to an event to which the images pertain, (b) generating an event boundary for the plurality of images based on the event-determining information; and (c) laying out the images for the event into a page format wherein the page format of the images comprising the event is adapted to the event boundary determined for the event.

These and other aspects, objects, features and advantages of the present invention will be more clearly understood and appreciated from a review of the following detailed description of the preferred embodiments and appended claims, and by reference to the accompanying drawings.

Advantageous Effect

The main effect of this invention is to create and develop a software system or application that enables the automatic organization and albuming of consumer images, such that various albuming features, such as image event clustering, dud identification, duplicate detection and page layout, may be achieved with a minimum amount of user intervention.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Still further, as used herein, the computer program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. In addition, the term "event" is defined herein as a significant occurrence or happening as perceived by the subjective intent of the user of an image capture device. Since an event may encompass such a large number of pictures as to be unwieldy for albuming as a single occurrence, the term "sub-event" is defined herein as a significant occurrence or happening within a given event, also as perceived by the subjective intent of the user of the image capture device. In particular, in the preferred embodiment, an event includes a grouping of images with similar capture time and date associated with them, and a sub-event includes a sub-grouping of images generally within a similar capture time and date that are judged to have similar image content. Clearly, other event-determining parameters may be used to delineate events and sub-events. Notwithstanding the above division of images into events and sub-events, the usage of the term "event" shall not be associated with specific event-determining information in the claims or specification unless specifically set forth otherwise, nor shall the existence of an "event" preclude or require the existence of a "sub-event".

A system for automatic albuming is essentially a tool for helping the user tell a particular story. This story may take on many forms: a comprehensive chronicle of the story of one's life or simply the record of a long weekend; it may take on a commercial dimension, such as a description of a realtor's property listing or the lifecycle of a manufacturing process. Automatically producing a story from a set of imagery requires knowledge of the context surrounding the pictures. This context determines which pictures are included, the order in which they are presented, and the manner in which they are presented. If the context is unavailable, it must be recreated using heuristics.

Before describing the present invention, it facilitates understanding to note that the present invention is preferably utilized on any well-known computer system, such as a personal computer or via the internet. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
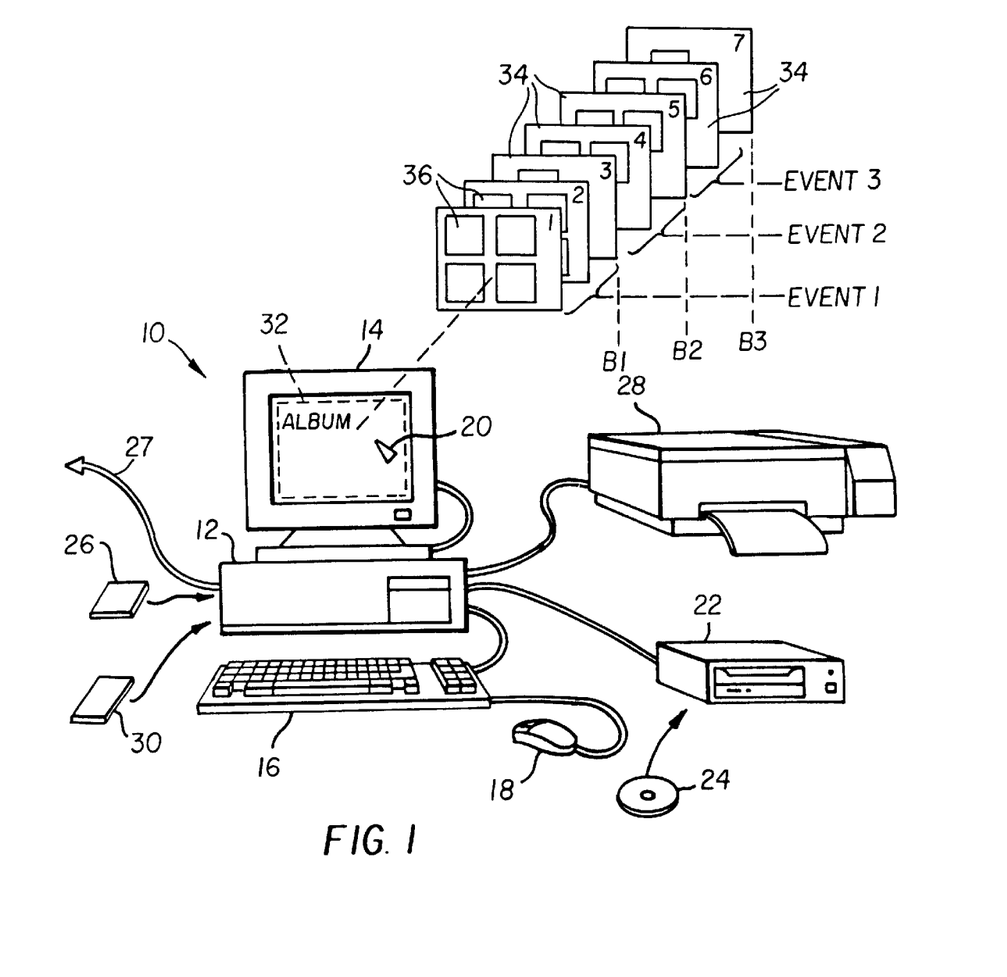
FIG. 1 is a perspective diagram of a computer system and its associated graphical user interface for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface organized according to the present invention. A keyboard 16 is also connected to the microprocessor based unit 12 for permitting a user to input information to the software. As an alternative to using the keyboard 16 for input, a mouse 18 may be used for moving a selector 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting the software programs and other information to the microprocessor based unit 12 via a compact disk 24, which typically includes a software program. In addition, a floppy disk 26 may also include a software program, and is inserted into the microprocessor-based unit 12 for inputting the software program. Still further, the microprocessor-based unit 12 may be programmed, as is well known in the art, for storing the software program internally. The microprocessor-based unit 12 may also have a network connection 27, such as a telephone line, to an external network, such as a local area network or the Internet. A printer 28 is connected to the microprocessor-based unit 12 for printing a hardcopy of the output of the computer system 10.

Images may also be displayed on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored in the PC card 30, the floppy disk 26 or the computer disk 34, or input through the network connection 27, may have been obtained from a variety of sources, such as a digital camera (not shown) or a scanner (not shown). In accordance with the invention, the display 14 is electrically connected to the microprocessor-based unit 12 for displaying a graphical user interface comprised of an album 32 organized in a sequence of album pages 34 (e.g., pages 1 . . . 7 in FIG. 1) according to the present invention. Albuming software implemented by the microprocessor-based unit 12 segments the input pictures 36 into a sequence of events (and sub-events, which will be described in detail), which are identified in FIG. 1 as event 1, event 2 and event 3. Each event includes a sequence of album pictures 35 that the albuming software has determined to be related. The events are terminated by respective event boundaries, which are identified in FIG. 1 as boundaries B1, B2 and B3.

The system described herein is an automatic albuming system with the ability to automatically determine the order in which pictures should be presented. It should be understood that no system will provide failsafe assurance that the pictures are always in the correct order. Nonetheless, the system provides an initial basis for automating the selection of images to be included in a given album. The core of the automatic albuming system consists of two modules: an event segmentation module and an automated layout module. The event segmentation module performs three main functions: image event clustering, dud detection, duplicate detection. The main goal of event clustering is to automatically segment a set of pictures into events and sub-events for layout onto an album page, based on date and time information recorded at capture time, as well as image content information. The objective of dud detection is to detect very low quality pictures, so that they can be excluded from the album if it is desirable to do so. Similarly, duplicate detection will be used to detect potential duplicate pictures so that the user can make a decision in choosing a one or more for inclusion into the album. The automated page layout module is responsible for determining the initial layout of a set of pictures on the album page. The page layout module takes as its input the set of events and sub-events as determined by the event segmentation module. It outputs a representation of the initial mapping of pictures to pages, specifying the placement of each picture on the page. The objective of page layout is to provide the picture layout requested by the user to the extent possible, and then to automatically adapt the layout to the boundary conditions of the sequence of pictures in each event. The features and functions comprising event segmentation and page layout are described in more detail, as follows.

1. Event Clustering

The event clustering algorithm segments pictures into events and sub-events, based on two sets of information: date and time of picture capture, and content similarity between pictures. If capture date and time are not available, such as is the case with 35 mm film, then the system uses the date the film was developed or, if that is not available, the date the developed pictures were digitized, if that information is available. This has the effect of grouping the pictures by film roll, which often is a useful approximation. If the user explicitly annotates a picture with a date and time, then that information will override any of the above date and time data. If date and time information is still not available, the algorithm will default to rely on image content information. (In the latter case, the whole set of images will default to an "event".) The basis of using time information for clustering is the assumption that most people will arrange their photos in some kind of chronological order. Moreover, the time differences between pictures within an event (or a sub-event) are typically smaller than the time differences between pictures from different events. The aforementioned copending Ser. No. 09/163,618, which is incorporated herein by reference, discloses an event clustering algorithm that segments pictures into events based on date and time of picture capture, basically separating a plurality of images into events based on boundaries between events which correspond to the largest time differences.

Referring to that application, the images are first ranked in chronological order by analyzing the time and date of capture of each image. The date and/or time of capture of each picture may be extracted, for example, from the encoded information on a film strip of Advanced Photo System (APS) images, or from information available from some digital cameras. The representations of the images are then placed into one of a plurality of distinct events by a date and time clustering analysis. Within each event, the contents of the images are analyzed for determining whether images closest in time to an adjacent event should be maintained in the event as defined by the clustering analysis, or the adjacent events merged together. Such a content-based algorithm is described in the aforementioned copending Ser. No. 09/197,363, (now U.S. Pat. No. 6,351,556) which basically involves computation of a color histogram for blocks enclosing main subject areas in each image and then determination of the histogram intersection value between the block of one image and the block of another image; from that the algorithm determines a threshold value for the computed histogram intersection value that determines content similarity between the block in the one image and the block in the other image.

After the images are defined into events, a further sub-classification (grouping) within each event is performed. In this regard, the images within each event will then be analyzed by content for grouping images of similar content together into sub-events, and then the date and time are used for further refining the grouping. The event segmentation using the date and time information is done by a K-means clustering technique, which groups the images into events or segments. More particularly, according to the application, a 2-means clustering is then performed on a mapped time-difference histogram for separating the mapped histogram into two clusters based on the time difference.

For further details of 2-means clustering, refer to the aforementioned application or to *Introduction to Statistical Pattern Recognition*, $2^{nd}$ edition, by Keinosuke Fukunaga, 1990. A boundary check is then performed on the segments for verifying that the boundary images should actually be grouped into the segment identified by the clustering. This block-based histogram correlation method together with the K-means clustering algorithm forms the basis of the event clustering algorithm. Further details of the event detection algorithm can be found in the above-noted applications.

2. Dud Detection

Low-quality pictures should be detected and potentially removed before the event clustering step described above. The detected dud pictures could be excluded from the album if the user chooses to enable the option. Detecting dud pictures automatically is a challenging task because image quality is subjective in nature. The approach taken here is to be more conservative in excluding pictures from the album. Only those pictures are removed that are of very low quality. The aforementioned copending Ser. No. 09/274,645, now U.S. Pat. No. 6,535,636 which is incorporated herein by reference, discloses a dud detection algorithm that can compute a number of objective quality measures, such as sharpness, noise, and contrast to determine the quality of the image. Referring to that application, an edge profile of the image is obtained by computing the absolute value of a Laplacian function evaluated over regions of the image. Then, an image intensity histogram of the edge profile is formed and the values that lie above the $90^{th}$ percentile represent the sharpest edges of the image. Next, an average (centroid) of the gradients of the sharpest edges, as determined in the previous step, is computed, and its average gradient is the measure of sharpness.

Furthermore, a contrast measure can be calculated from the standard deviation of the image intensity histogram obtained from pixels on the edges of the image. Next, a noise measure is calculated: a histogram of the edge profile, which is obtained by computing the absolute value of the Laplacian, is formed and the values that lie below the $10^{th}$ percentile of the histogram represent the flat regions of the image. The standard deviation of the image intensity in the flat regions, as determined in the previous step, is computed and the noise measure is then the standard deviation of these flat regions over the entire image. In regard to exposure, the overall brightness of an image is an indication of overexposure or underexposure. Each pixel of the image is compared to an underexposure or overexposure threshold. The percentage of pixels in the image that are below or above the respective thresholds are computed. If the above percentage is larger or smaller than certain percentage thresholds then the image is a dud. Furthermore, the user is able to vary the several thresholds in order to reflect a level of image quality that is acceptable. Further details of the dud detection algorithm can be found in the above-noted application.

3. Duplicate Detection

In many photographing situations, multiple pictures are taken to ensure that an important scene be captured properly. The ability to detect the occurrence of duplicate pictures so that the user can pick the best one for inclusion into the album page will help the albuming process. The general definition of duplicate pictures is a set of pictures that are taken from almost the same camera angle, with almost identical subjects in the scene. This set of pictures will usually be taken in very close time interval. Since duplicate detection can be achieved by using content analysis, the duplicate detection function is realized using the same block-based histogram correlation technique mentioned above. Again, the user is allowed to vary a duplicate threshold that will reflect the level of similarity between a set of duplicate pictures.

4. Page Layout

The page layout module presents to the user an automatically laid out album, organized by event, with the algorithm choosing the following albuming parameters by default, unless otherwise specified by the user:

picture selection—all pictures by default in an album are a subset of the pictures from the current image grouping, i.e., unless explicitly chosen in some other manner by the user, a set of pictures just added by the user to the collection of pictures will be used.

number of pictures laid out on a page.

picture size and orientation—e.g. classic, HDTV, or panoramic sizes, and landscape or portrait orientation, as per the original image (for Advanced Photo System film the orientation data is recorded on the magnetic region on the film).

border style, with the choice of border being chosen from a set of extensible styles, e.g., in the present embodiment the color and the width of the border.

background style, with the choice of background being chosen by the user from a set of extensible styles.

page size.

automatic captioning—may include the date and a caption entered by the user (or taken from the magnetics if recorded with Advanced Photo System film).

Typically the user is given the opportunity to change these algorithmic choices via a user preference selection. For instance, the user would typically select the maximum number of pictures to be laid out on a page. Border and background style could also be user selected. Data pertaining to each picture imported into the system may specify such parameters as orientation and picture size.

Certain constraints are forced on the initial layout. For instance, the page layout module groups all pictures from a single event together, using the smallest number of pages that satisfies the user's limit on the maximum number of pictures that may appear on a page. Adjacent sub-events may be combined to appear on the same page or may always be separated by page at sub-event boundaries, which is optional dependent upon a statically specified user preference as long as the combination of the events does not cause the limit on the maximum number of pictures per page to be violated.

The number of pictures that actually fit on a page are determined either by a parametric method, or by attributes of the pictures themselves. The parametric method is based on a number of rules that are applied to an image space divided into a number of grid components. For instance, the following rules are exemplary of rules that may be applied in the present embodiment to Advanced Photo System pictures:

The number of grid components on a page is equivalent to the maximum number of pictures per page, where each panoramic picture occupies two grid components.

Each normal and HDTV picture occupies a minimum of one grid square, along with any picture whose aspect ratio is less than or equal to 1:2 (or 2:1).

Each panoramic picture (any picture having an aspect ratio greater than 1:2 or 2:1) occupies a minimum of two grid squares.

Each picture should be centered in its grid square, with panoramic pictures occupying two grid squares. If grid squares adjacent to the picture are empty, then the picture may be centered in the combined area.

No two pictures should overlap.

Figure 3:
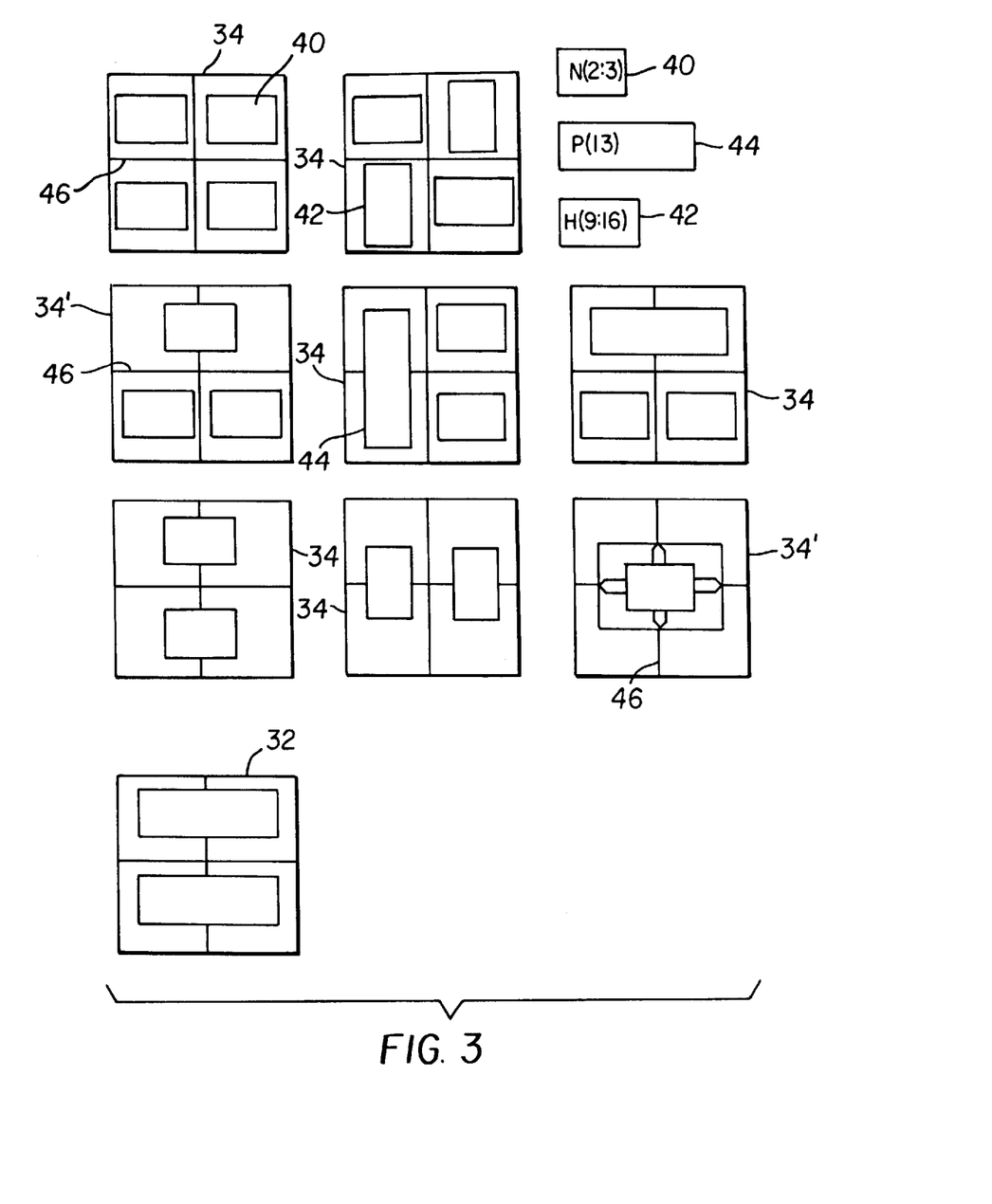
FIG. 3 is a diagram illustrating the various combination of Advanced Photo System pictures that may be laid out on a page for a predetermined maximum number of pictures per page.

The results of such a parametric method are shown in FIG. 3 specifically for pictures obtained from Advanced Photo System film. Such pictures include data identifying themselves as a classic/normal picture 40 (having an aspect ratio of 2:3), a HDTV picture 42 (having as aspect ratio of 9:16) or a panoramic picture 44 (having an aspect ratio of 1:3). The data accompanying these pictures also may define their orientation. Pictures imported from other film formats may have different aspect ratios. In each example of album pages 34 in FIG. 3, the page is divided into grid lines 46, and the pictures are placed according to the aforementioned parametric rules. Pages 34' are examples of pages where grid squares adjacent to a picture are empty, and the picture is centered in the combined area.

The actual layout of the pictures on the pages may also be determined by matching attributes of the pictures, such as their size, to a set of templates. A page containing h horizontally aligned (landscape) classic/normal pictures 40 or HDTV pictures 42, v vertically aligned (portrait) classic/normal pictures 40 or HDTV pictures 42, hp horizontally aligned panoramic pictures 44, and vp vertically aligned panoramic pictures 44 will match a template if the template contains the same number of like aligned pictures for each of h, v, hp, and vp. In this case, each page 34 shown in FIG. 3 would constitute a template that is subject to selection by the albuming system depending on the number and size of the pictures to be placed on a particular page. Depending on how many pictures should go on a page, the size is explicitly specified if a template is found; otherwise, the parametric algorithm enlarges the pictures as appropriate.

Figure 2:
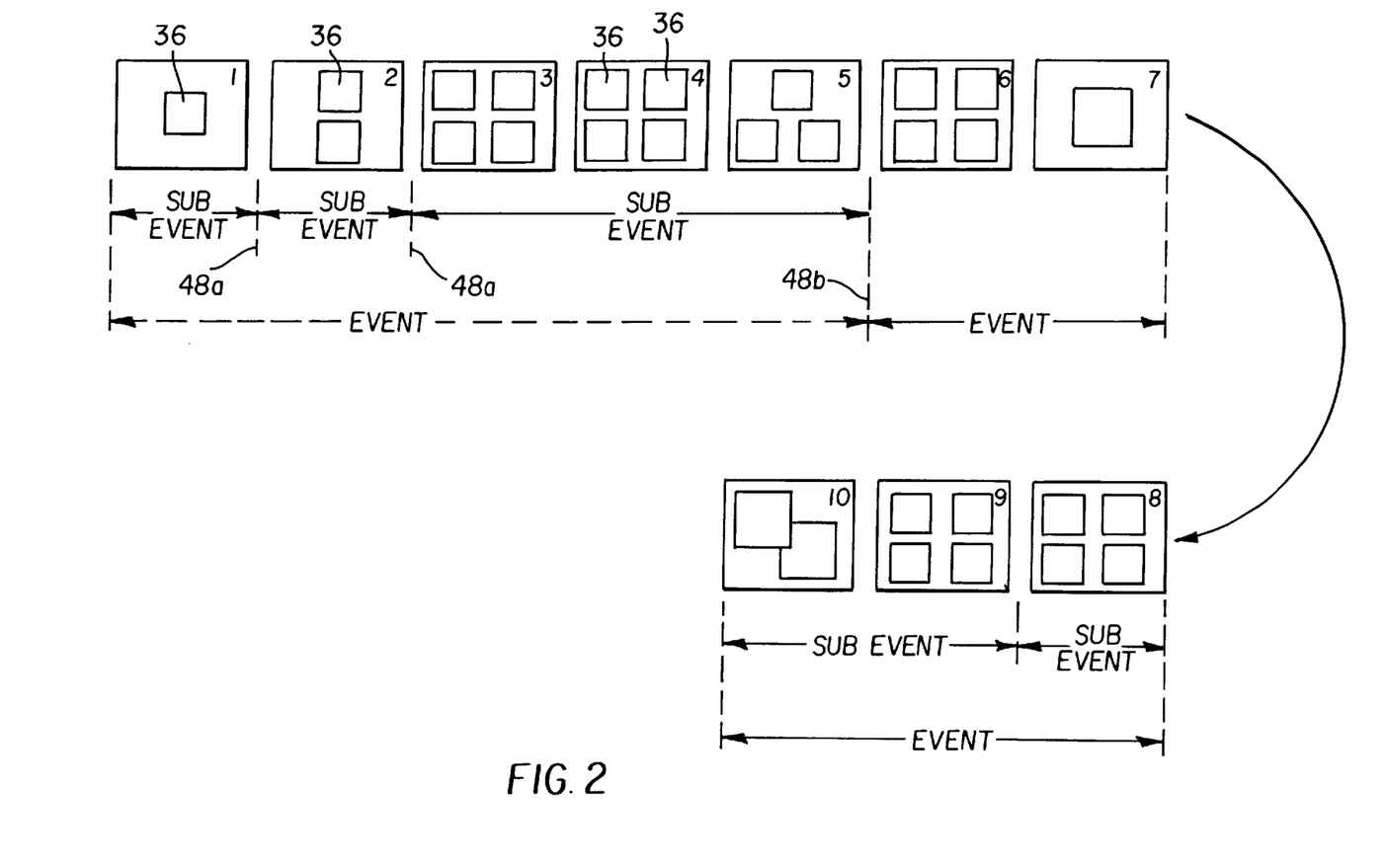
FIG. 2 is a diagram of a sequence of album pages segmented by event and sub-event with page layout automatically adjusted according to the present invention.

The above functions have been integrated into the automated albuming software system in order to provide a sequence of images segmented into events and sub-events that are then ready for display to the user. This application can be accessed and executed by the consumer on a personal computer in the album page format as shown in FIG. 1. Referring again to FIG. 2, a sequence of album pages are shown in which the images 36 are shown as classic/normal pictures for ease of illustration and in various configurations in order to illustrate implementation of the invention. The images 36 are segmented into events and sub-events each having unique sub-event boundaries 48a and event boundaries 48b. As explained before, the maximum number of pictures per page may either default to a system default parameter or the user may specify the number as an input parameter, e.g., four to a page (4-up), as shown in FIG. 2. Also as shown in FIG. 2, the actual number of pictures determined by the albuming algorithm to belong to an event or a sub-event may not turn out to be an even multiple of the maximum number per page, and may in fact be a fraction of the maximum number, such that the number of images available for the last page (or the first, and only page) may not correspond to the system default or the parameter set by the user. In that situation, the albuming algorithm arranges the remaining pictures in some appropriate predetermined way, e.g., centered (if one or two remaining pictures), or in a balanced group (if three remaining pictures), as shown in connection with the parametric options expressed in connection with FIG. 3. The algorithm may further split the images over several pages in a more balanced fashion, e.g., if the maximum number is four images per page, and an event contains five pictures, the images may be split three and two between two pages, rather than four and one, in order to obtain a more pleasing result. In addition, the pictures may be suitably scaled for each page.

Although the present rules of the preferred embodiment do not provide for it, FIG. 2 shows that one remaining picture could be enlarged and two remaining pictures could be enlarged and overlapped diagonally. This predetermined way of dealing with the actual boundary condition of the events and sub-events may be a parametric- or template-based "fit" (i.e., the decision of the system designer) or it may be preset by user input at an initialization stage in the running of the albuming program. In any case, the auto-albuming feature will help the consumer to create albums by presenting a "first draft page layout" with each event and sub-event segment ending laid out with at least a reasonably aesthetically pleasing result, including on the last page. It is expected that the user would have the ability to view the algorithm's placement of pictures and then to accept (perhaps by inaction) or to override the automatic layout decision.

Figure 4:
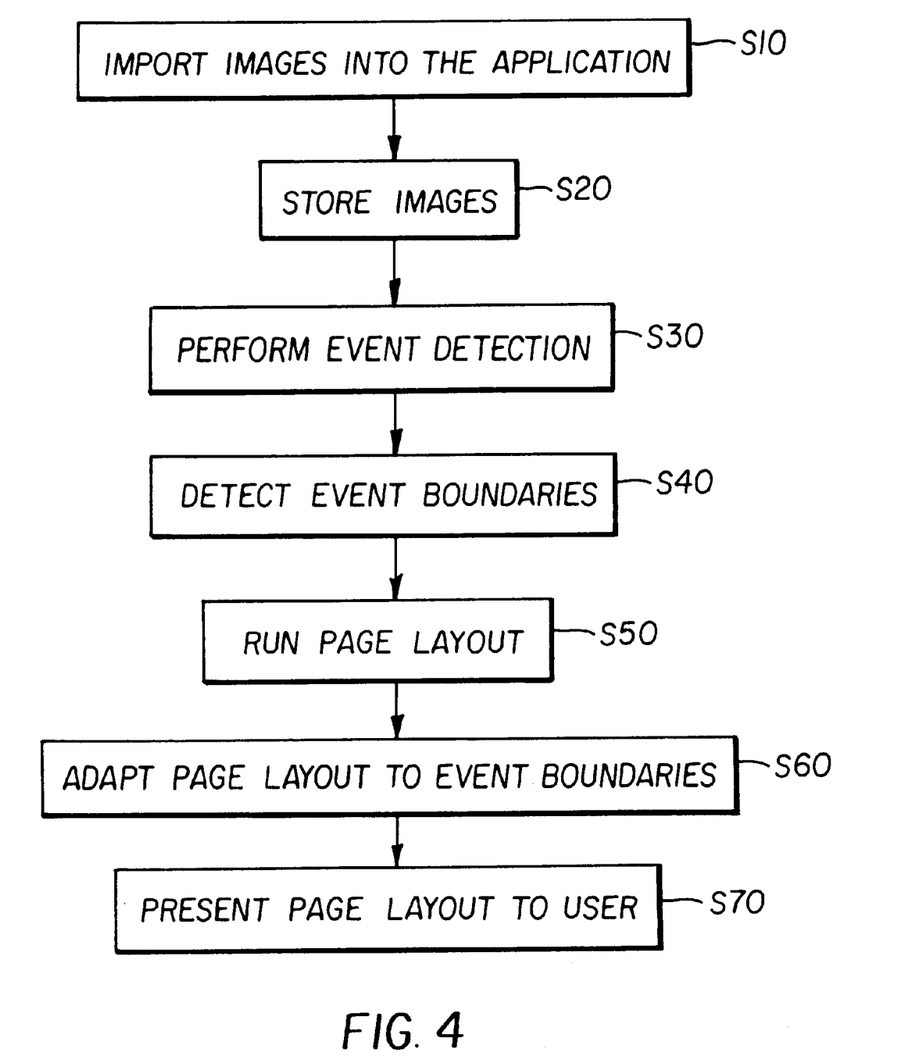
FIG. 4 is a flow diagram of the basic albuming method including page layout according to the present invention.

FIG. 4 is a flow diagram illustrating a global view of the basic steps involved in the albuming process, including the detection of which pictures belong in each event and the page layout routine applied to the resulting pictures according to the invention. In connection with FIGS. 1 and 2, which show a graphical user interface comprising the set of screens produced by the computer system 10 in its implementation of the present invention, when the basic algorithm described in FIG. 4 is run, the images are first imported S10 into the storage section of the microprocessor-based unit 12, where they are stored S20. The system (or user) would typically establish a number of default parameters, including certain aspects of the page layout such as the maximum number of images that are to be displayed on each page (e.g., 2-up, 4-up, etc.), how the orientation of such images (landscape or portrait) would affect the display, borders to go around each image, and so on. The aforementioned event detection algorithm is then run S30 and event and sub-event boundaries are determined S40 that delineate the end of each event or sub-event. The page layout algorithm is then run S50 in accordance with the aforementioned rules and the images are grouped into the selected page layout by event or sub-event.

As shown in FIG. 2, a series of screens are generated for each event with no greater than a maximum number of images displayed on each screen (page). If fewer than the maximum number of images are left over for display on the last album page, the page layout algorithm will adapt S60 the layout of the last album page in accordance with the event or sub-event boundary established for that event. A number of actions are possible: one or more of the images may be centered within the white space, as shown in album pages 1 and 2. An image may be enlarged to fill the last album page as shown in album pages 7. Some pictures may be overlapped as shown in album page 10. Alternatively, the images may be grouped in a more pleasing balanced arrangement as shown in album page 5. Numerous other possibilities will be clear to one of ordinary skill in such page layouts, and such combinations are intended to be included in the claims, though not specifically mentioned. Also, the user may predetermine such default parameters that determine how the page layout algorithm will adapt to the remaining images. As a result, the events are displayed S70 in a series of screens optimized for a predetermined number of images on each page with the last page adapted to the remaining images in each event.

Figure 5:
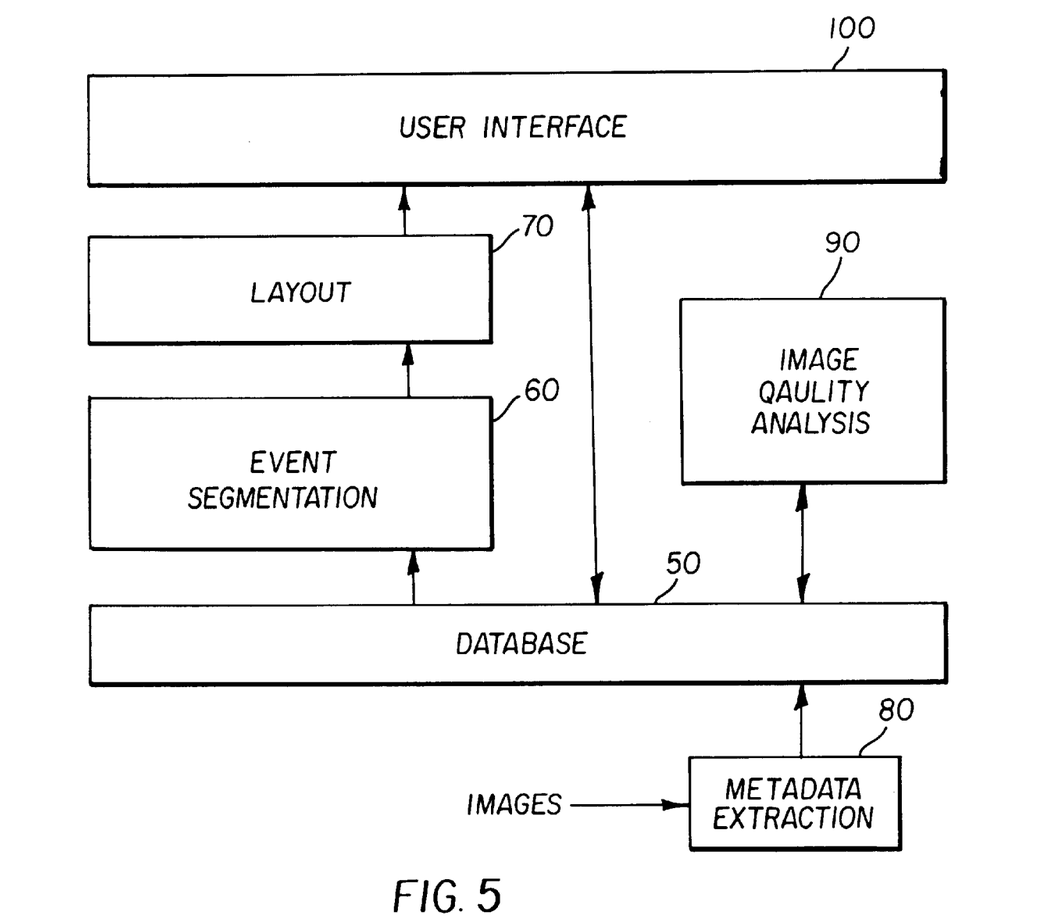
FIG. 5 is a block diagram of the system architecture of the albuming method according to the present invention.

The basic architectural foundation for the albuming application is a conventional database 50, as shown in the architectural block diagram of FIG. 5. This database provides an event segmentation module 60 (which provides event clustering, duplicate detection and dud detection) and a layout module 70 with the necessary information to perform their functions, as explained herein. As images are imported into the system, all available and relevant metadata is extracted from the image file in the metadata extraction module 80 and added to the database. As defined herein, "metadata" means any type of data that is useful in describing attributes of the image, such as picture size, picture orientation, capture data and time. Newer image file formats such as Exif [see Japan Electronic Industry Development Association, *Digital Still Camera Image File Format Standard(Exif)*, JEIDA-49-1998, 1998]and Flashpix [see Eastman Kodak Company, *FlashPix Format Specification*, Ver. 1.0, 1996] provide containers for image metadata such as capture date and time. In addition to storing metadata, a subsampled image corresponding to the screen resolution—by default, an 800×600 pixel image for pictures with a 1.5 aspect ratio—is added to the database. This image provides access to the image data needed for on screen rendering without requiring the entire image to be present. Pictures are also analyzed for image quality in an image quality analysis module 90 as they are added to the database. For computational efficiency, the current system simply uses the exposure-based metric described earlier. This metric is recorded in the database along with the other metadata. In addition to the database 50, and the event segmentation and layout modules 60 and 70, the architecture includes a user interface 100 that enables the user to preview and edit the generated album.

Image metadata such as date and time, if available, provides valuable context information. The more context information present, the better the system is able to organize and present the imagery. Other metadata extracted include rotation, as images commercially scanned may have a suggested rotation noted in the image file. Many other metadata tags have been defined in the relevant file format, though the metadata information is not always available. Such additional metadata information includes GPS (global position) information to determine location, and subject depth information. Clearly such information will have great value in defining the context surrounding a picture capturing event, particularly when there are more capture devices that are capable of recording such information. In addition to automatically captured metadata, the database provides a place for users to add their own annotations for pictures.

Figure 6:
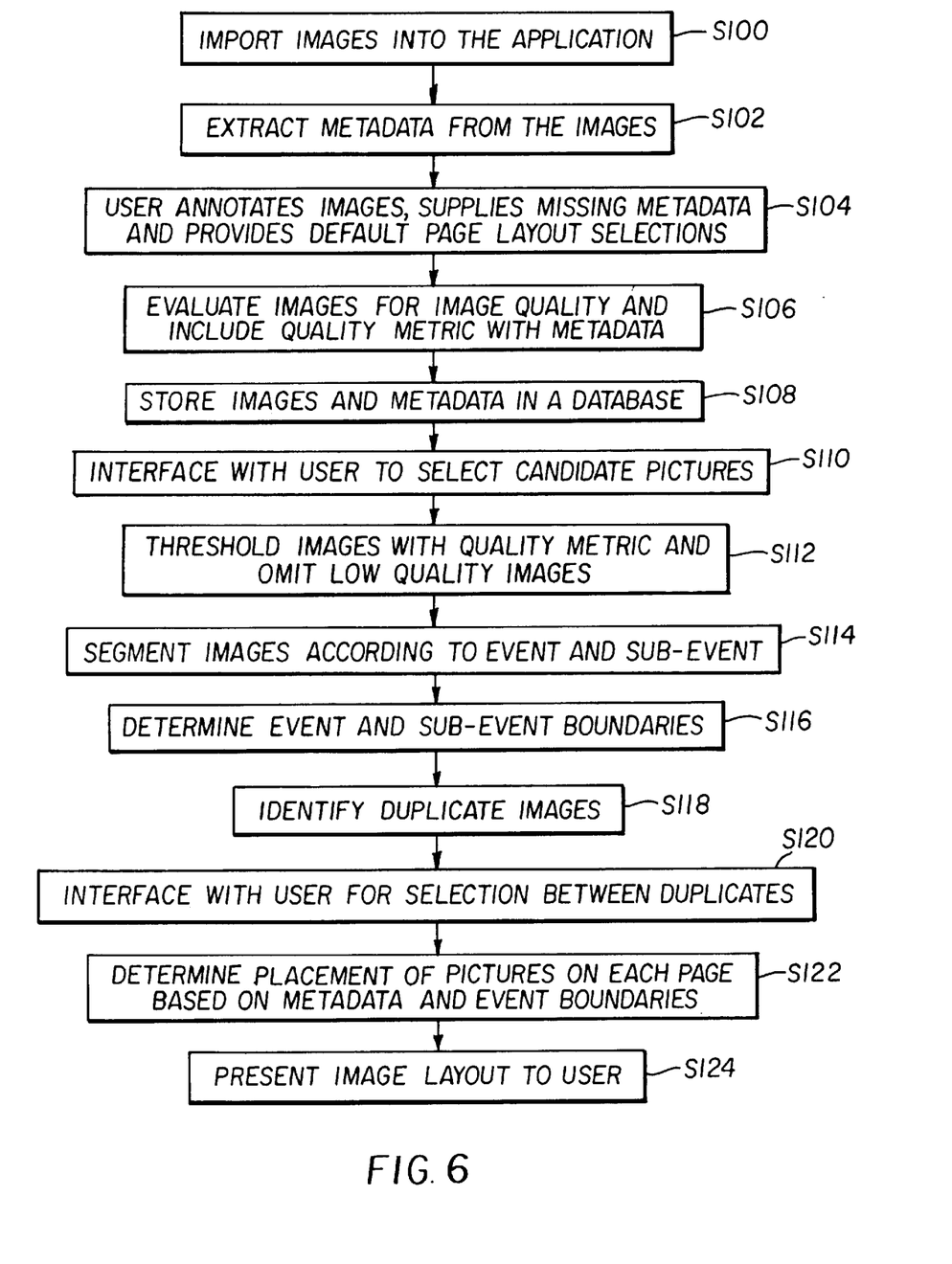
FIG. 6 is a flow diagram of the overall workflow of the albuming method according to the present invention.

FIG. 6 shows in detail the overall workflow of the automatic albuming system. The user imports the pictures S100 into the application and the associated metadata is extracted S102 from the pictures. As part of the importing process, the user may annotate S104 pictures with captions and supply missing metadata, such as date information, but these activities are not required. In addition, the user may establish album default selections in terms of image density per page, page background, and the inclusion of automatically generated captions. The pictures are analyzed S106 for image quality and this quality metric is recorded S108 with the images in the database along with the other metadata. To produce an album, the user must first select S110 the set of candidate pictures to be included in the album. This may simply be the set of pictures just imported into the database, but it may also be an arbitrary set of pictures selected from the database. The architecture may be designed to allow the user to select this set using an arbitrary query based on the stored metadata. The selected set of pictures is filtered by omitting S112 those pictures whose image quality metric is below some threshold. Then the filtered set of pictures are input into the event segmentation stage S114, which uses the previously described algorithm to determine S116 event and sub-event boundaries. In addition, pictures within an event or sub-event deemed to be duplicates are identified S118. The user is asked S120, for each set of duplicates, to identify which pictures should be included in the album. For example, a dialog box may be displayed to the user, enabling the user to select which pictures from the duplicate set that should be included in the album.

The final set of pictures for each event and sub-event is then passed to the layout stage S122, which is responsible for determining the placement of pictures on the page based on event boundaries, as explained in connection with FIG. 3. Metadata may also be useful in determining layout. For example, Advanced Photo System (APS) cameras permit the user to select one of three aspect ratios when taking a picture. This intended aspect print ratio is recorded on the film's magnetic layer and eventually included in the digitized representation of the image, and thereafter may be part of the metadata captured by the present system. This field enables the layout stage to present a picture in the desired aspect ratio, e.g., a panoramic format. The final album is presented S124 using XML (Extensible Markup Language), see World Wide Web Consortium, *Extensible Markup Language (XML)* 1.0, REC-xml-19980210, Feb. 10, 1998. Defining an XML schema to represent albums provides the application with off-the-shelf tools for parsing and manipulating an album representation, plus it gives the album description a high degree of portability. The user previews the layout produced by the application according to the customer's default selections in terms of image density per page, page background, and the inclusion of automatically generated captions. The application allows the user to perform the basic image manipulation operations on the automatically generated album, including changing borders and adding text. If hardcopy output is desired, the XML-based description of the album is rendered for the appropriate printer.

In a typical implementation of the invention, the computer program product bearing the inventive algorithms would either be provided directly to a customer, who would use it in connection with the customer's processing of images, or it would be used in a kiosk setting, where a customer would bring pictures and/or negatives to the kiosk for scanning and enhancement, or would directly enter digital scan data into the kiosk. Alternatively, the algorithms could be made available in a web-based version of the product, where either the algorithms are downloaded via the network connection to the customer or the algorithm computation is done on a server in a web-based environment.

The invention has been described with reference to a preferred embodiment. However, it will be appreciated that variations and modifications can be effected by a person of ordinary skill in the art without departing from the scope of the invention.

Parts List 10 computer system
12 microprocessor-based unit
14 display
16 keyboard
18 mouse
20 selector
22 compact disk read-only-memory (CD-ROM)
24 compact disk
26 floppy disk
27 network connection
28 printer
30 personal computer card (PC card)
32 album
34 album pages
36 images
38
40 classic/normal picture
42 HDTV picture
44 panoramic picture
46 grid lines
50 database
60 event segmentation module
70 layout module
80 metadata extraction module
90 image quality analysis module
100 user interface

What is claimed is:

1. A method for automatically adapting the page layout of a plurality of images to a boundary condition of an event, said method comprising the steps of:
    (a) receiving a plurality of images having event-determining information including at least one of time and date as well as content information that relates to an event to which the images pertain;
    (b) automatically generating an event boundary and a sub-event boundary for the plurality of images based on the event-determining information, wherein time and date event boundaries are determined by clustering analysis and content sub-event boundaries are determined by block-based histogram correlation; and
    (c) automatically laying out the images for the event into a page layout wherein the page layout of the images comprising the event is adapted to both the event boundary and the sub-event boundary determined for the event, wherein at least some adjacent sub-events are separated by page at sub-event boundaries.

2. A method for automatically adapting the page layout of a plurality of images to a boundary condition of an event, said method comprising the steps of:
    (a) receiving a plurality of images having event-determining information that relates to an event to which the images pertain;
    (b) automatically identifying and eliminating low quality images among the plurality of images using one or more of sharpness, noise, exposure and contrast quality measures to determine quality of the images, whereby a user is able to vary one or more of the quality measures in order to determine a level of image quality that is acceptable, thereby generating a plurality of acceptable images;

(c) automatically generating an event boundary for the plurality of acceptable images based on the event-determining information;

(d) automatically identifying duplicate images in an event using a histogram correlation content analysis;

(e) interfacing with the user to eliminate duplicate images in the event, whereby the user is able to vary a duplicate threshold in order to determine a level of similarity between a set of duplicate images; and (f) automatically laying out the images for the event into a page layout according to a parametric model wherein the page layout of the images comprising the event is adapted to the event boundary determined for the event, wherein the parametric model is based on a number of rules that are applied to an image space divided into a number of grid components, and wherein a combined area of two or more grid components is used to lay out at least some of the images.

3. The method as claimed in claim 2 wherein the images include normal, HDTV and panoramic pictures and wherein the rules that are applied to the image space comprise:

the number of grid components on a page are equivalent to a maximum number of pictures per page, where each panoramic picture occupies a minimum of two grid components;

each normal and HDTV picture occupies a minimum of one grid component, along with any picture whose aspect ratio is less than or equal to 1:2 (or 2:1);

each panoramic picture (along with any picture having an aspect ratio greater than 1:2 or 2:1) occupies a minimum of two grid components; and each picture should be centered in its grid component, with panoramic pictures occupying two grid components.

4. The method as claimed in claim 2 wherein the rules further include that if grid components adjacent to the picture are empty, then the picture is centered in the combined area.

5. The method as claimed in claim 2 wherein the rules further include that no two pictures should overlap.

6. A method for automatically adapting the page layout of a plurality of images to a boundary condition of an event, said method comprising the steps of:

(a) receiving a plurality of images having event-determining information including at least one of time and date as well as content information that relates to an event to which the images pertain;

(b) automatically generating an event boundary for the plurality of images based on the event-determining information, wherein time and date event boundaries are determined by clustering analysis and content boundaries are determined by block-based histogram correlation; and (c) automatically laying out the images for the event into a page layout according to a rule-based parametric model wherein the page layout of the images comprising the event is adapted to the event boundary determined for the event.

7. A method as claimed in claim 1 wherein step (c) further includes laying out the images for the event into a page layout having a maximum number of images per page as predetermined via a user interface, wherein the page layout of the event is further adapted to the maximum number of images per page.

8. A method as claimed in claim 1 wherein the number of images for the event laid out in step (c) further includes a remaining number of images, fewer than a predetermined maximum number, for a last page ending with the event boundary.

9. A method as claimed in claim 1 wherein step (c) further includes rearranging a remaining number of images, fewer than a predetermined maximum number, into a page format for the last page that is different from the page format of the preceding pages of the event.

10. A method as claimed in claim 1 wherein step (c) further includes rearranging a remaining number of images, fewer than a predetermined maximum number, changing the size of at least one of the remaining images.

11. A method as claimed in claim 1 wherein the step (c) further includes rearranging a remaining number of images, fewer than a predetermined maximum enlarging at least one of the remaining images.

12. A method as claimed in claim 1 wherein the step (c) further includes rearranging a remaining number of images, fewer than a predetermined maximum overlapping at least two of the remaining images.

13. A method as claimed in claim 1 wherein step (c) further includes rearranging a remaining number of images, fewer than a predetermined maximum into a page format for the last two or more pages of the event that is different from the page format of the preceding pages of the event.

14. A method as claimed in claim 1 wherein the event-determining information received in step (a) further comprises at least one of a title and a caption corresponding to the images.

15. A method as claimed in claim 1 wherein the event-determining information received in step (a) further comprises at least one of a title and a caption corresponding to the images and wherein the event boundary determined in step (b) is based on at least one of the title and caption.

16. A method as claimed in claim 1 wherein the images are obtained from the digitization of photographic film and the event-determining information received in step (a) comprises the capture date if that is available, and if capture date is not available then the date of film development, and if the date of film development is not available then the date of digitization.

17. A method as claimed in claim 1 wherein the number of images for the event laid out in step (c) that are spread over the last two or more pages of the event include fewer than the maximum number of images per page.

18. A method as claimed in claim 6 wherein step (c) further includes laying out the images for the event into a page layout having a maximum number of images per page as predetermined via a user interface, wherein the page layout of the event is further adapted to the maximum number of images per page.

19. A method as claimed in claim 6 wherein the number of images for the event laid out in step (c) further includes a remaining number of images, fewer than a predetermined maximum number, for a last page ending with the event boundary.

20. A method as claimed in claim 6 wherein step (c) further includes rearranging a remaining number of images, fewer than a predetermined maximum number, into a page format for the last page that is different from the page format of the preceding pages of the event.

21. A method as claimed in claim 6 wherein step (c) further includes rearranging a remaining number of images, fewer than a predetermined maximum number, changing the size of at least one of the remaining images.

22. A method as claimed in claim 6 wherein the step (c) further includes rearranging a remaining number of images, fewer than a predetermined maximum enlarging at least one of the remaining images.

23. A method as claimed in claim 6 wherein the step (c) further includes rearranging a remaining number of images, fewer than a predetermined maximum overlapping at least two of the remaining images.

24. A method claimed in claim 6 wherein step (c) further includes rearranging a remaining number of images, fewer than a predetermined maximum into a page format for the last two or more Pages of the event that is different from the page format of the preceding pages of the event.

25. A method as claimed in claim 6 wherein the event-determining information received in step (a) further comprises at least one of a title and a caption corresponding to the images.

26. A method as claimed in claim 6 wherein the event-determining information received in step (a) further comprises at least one of a title and a caption corresponding to the images and wherein the event boundary determined in step (b) is based on at least one of the title and caption.

27. A method as claimed in claim 6 wherein the images are obtained from the digitization of photographic film and the event-determining information received in step (a) comprises the capture date if that is available, and if capture date is not available then the date of film development, and if the date of film development is not available then the date of digitization.

28. A method as claimed in claim 6 wherein the number of images for the event laid out in step (c) that are spread over the last two or more pages of the event include fewer than the maximum number of images per page.

* * * * *